(12) United States Patent
Stringham

(10) Patent No.: US 7,631,357 B1
(45) Date of Patent: Dec. 8, 2009

(54) DETECTING AND REMOVING ROOTKITS FROM WITHIN AN INFECTED COMPUTING SYSTEM

(75) Inventor: Russell R. Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 749 days.

(21) Appl. No.: 11/243,824

(22) Filed: Oct. 5, 2005

(51) Int. Cl.
*G06F 12/14* (2006.01)

(52) U.S. Cl. .................................................. 726/24
(58) Field of Classification Search .............. 726/22–25
See application file for complete search history.

(56) References Cited

U.S. PATENT DOCUMENTS

| | | | |
|---|---|---|---|
| 6,795,966 B1* | 9/2004 | Lim et al. ................. | 718/1 |
| 2004/0078636 A1* | 4/2004 | Suzaki ....................... | 714/6 |
| 2005/0193428 A1* | 9/2005 | Ring et al. ................. | 726/22 |
| 2006/0031673 A1* | 2/2006 | Beck et al. ................ | 713/164 |
| 2006/0294592 A1* | 12/2006 | Polyakov et al. ......... | 726/24 |

\* cited by examiner

*Primary Examiner*—Nasser G Moazzami
*Assistant Examiner*—Travis Pogmore
(74) *Attorney, Agent, or Firm*—Advantedge Law Group, LLC

(57) ABSTRACT

A computing system configured to detect and/or remove a rootkit. For detection, a snapshot component takes a snapshot of a storage unit. A rootkit detection component accesses an enumeration of individual files stored on the storage unit using an alternative file system I/O to detect the presence of a rootkit. For removal, the location of a rootkit is identified and a computing system shutdown is initiated. A snapshot component pauses the shutdown operation prior to the completion of the shut down and takes a snapshot of a file storage unit. A rootkit repair component accesses the identified location of the portion of the file storage unit containing the rootkit and modifies the portion of the snapshot of the file storage unit so as remove the rootkit.

19 Claims, 5 Drawing Sheets

DETECTING AND REMOVING ROOTKITS FROM WITHIN AN INFECTED COMPUTING SYSTEM

CROSS-REFERENCE TO RELATED APPLICATIONS

Not applicable.

BACKGROUND OF THE INVENTION

Computing technology has revolutionized the way people work and play and has contributed enormously to the advancement of humankind. Computers now aid in enumerable applications such as word processing, computer simulations, advanced gaming, voice recognition, among much more. Computing systems now come in a wide-variety of forms including, for example, desktop computers, laptop computers, Personal Digital Assistants (PDAs), and even mobile telephones and devices.

Unfortunately, as the use of computing systems has increased, so has the prevalence of computer viruses. Computer viruses are typically executable code that is designed to disrupt the normal and desired operation of a computing system. For example, a computer virus may corrupt an operating system or destroy valuable data files. Other computer viruses may collect important private data such as financial information and passwords and provide this information to outside sources. It is therefore important that steps be taken to detect and remove a computer virus from an infected computing system.

The most common way of detecting and removing a computer virus from an infected computing system is by using an anti-virus computing program. Anti-virus programs are designed to detect and remove a computer virus from the computing system. The anti-virus programs often scan the file system of a computing system to find and then remove viruses from infected data files. Once the computer virus has been removed, the computing system can once again operate in a normal fashion.

However, one type of computer virus called a "rootkit" has proven very hard for normal anti-virus programs to detect and remove. This is due to the fact that rootkits are designed to hide themselves by manipulating file system I/O. Rootkits are installed inside an operating system and then filter system calls that are normally used to detect computer viruses. For example, a rootkit often filters requests to the file system by normal anti-virus programs for directory listings by removing the names of infected files from the list of files in the directory listing before the directory listing is returned to the requesting anti-virus program. For example, there may actually be six files in the directory listing including the viral file, but only the five non-viral files are listed in the response. Since the infected files are not shown in the directory listing, the anti-virus program cannot detect and remove the virus.

This process is illustrated in FIG. 1, which depicts a first operating system 100, a request module 110, a rootkit 120, and a file system 130. As illustrated, the rootkit 120 is logically situated between the request module 110 and the file system 130 in the operating system 100. This positioning allows the rootkit 120 to monitor all file system I/Os between the request module 110 and the file system 130. For instance, the rootkit 120 may monitor directory listing requests, and corresponding directory listing responses. Specifically, file system requests may pass from the request module 110 through the rootkit 120 to the file system 130 as represented by arrow 140. The file system response passes from the file system 130 through the rootkit 120 to the request module 110 as represented by the arrow 150. However, the rootkit 120 has an alteration module 121 which may intercept the response, manipulate the response, and provide only the manipulated response back to the request module 110.

A conventional way to detect and remove a rootkit is to boot the computing system using an alternate operating system that is different from the operating system that the computing system normally runs. The alternate operating system is then used to scan the file system of the normal operating system. Since the normal operating system is not running, the rootkit is not able to hide itself since the rootkit does not appear in the alternate file system I/O path. Thus, the rootkit may be detected and removed. This is also depicted in FIG. 1, which shows a second operating system 160 scanning file system 130 using bidirectional communication represented by bi-directional arrow 170.

While this conventional method of detecting and removing is often effective, it does have disadvantages. For example it is very costly and time consuming to reboot the computing system with the alternate operating system if a business or other user requires the infected computing system to be constantly operational for business purposes. In addition, some businesses or other users may not be able to routinely reboot from the alternate operating system to regularly check for rootkits as they cannot afford the resulting computing system down time. Also, some businesses or other users may not have an alternate operating system readily available. Therefore, it would be advantageous to have the ability to detect and remove rootkits from an infected computing system without the need to reboot the computing system with an alternate operating system.

BRIEF SUMMARY OF THE INVENTION

The forgoing problems with the prior state of the art are overcome by the principles of the present invention, which relate to the detection of a rootkit and to the removal of a detected rootkit. The computing system may include a file storage unit, a rootkit detection/repair component and a snapshot component.

In accordance with one aspect of the present invention in which the rootkit is detected, the computing system may also include an alternative file system I/O. The snapshot component takes a snapshot of at least a portion of the file storage unit. The rootkit detection component then uses the alternate file system I/O to accesses the snapshot to thereby create an enumeration of individual files stored on the storage unit. Finally the rootkit detection component uses the enumeration to detect the presence of a rootkit. Accordingly, the rootkit may be detected without the use of an alternative operating system.

In accordance with another aspect of the present invention, a rootkit is removed. The location of the rootkit is identified and a computing system shutdown is initiated. The snapshot component then pauses the shutdown operation prior to the completion of the shut down and takes a snapshot of at least a portion of the storage unit. The rootkit repair component accesses the identified location of the portion of the storage unit containing the rootkit and modifies the portion of the snapshot of the storage unit so as remove the rootkit. Therefore, the rootkit may be quickly and efficiency removed in an automated fashion.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
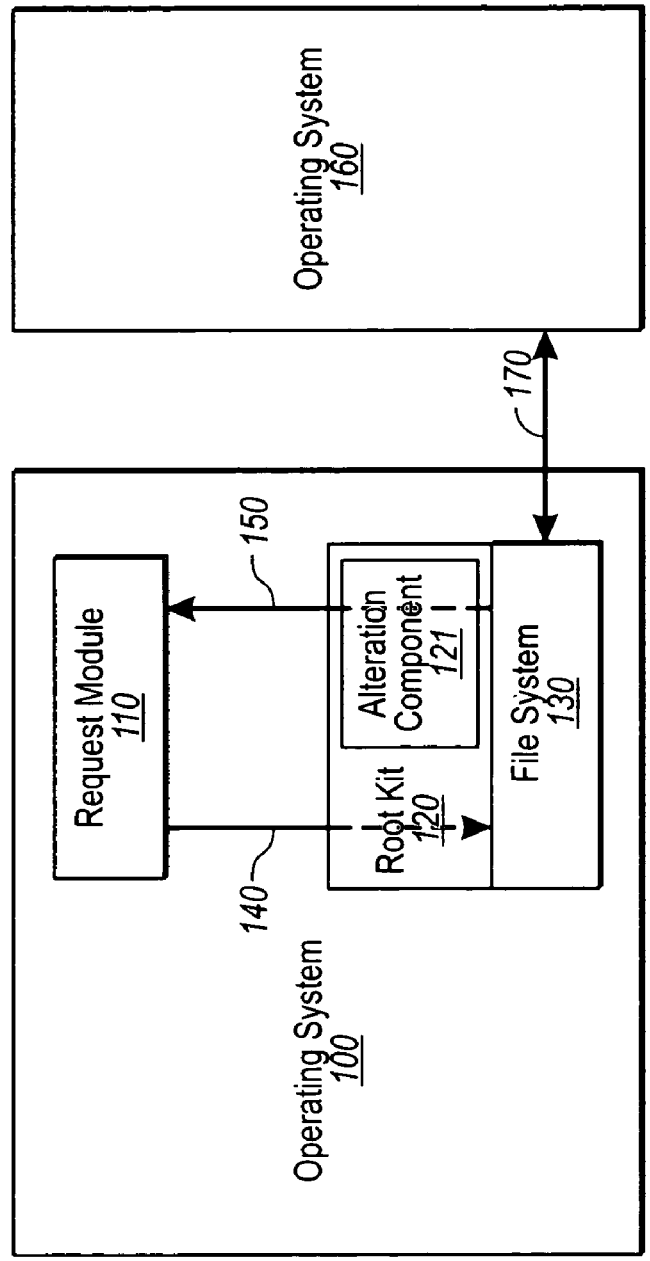
FIG. 1 schematically illustrates a process for removing a rootkit from a computing system in accordance with the prior art.

The principles of the present invention relate to the detection of a rootkit and to the removal of a detected rootkit. Turning to the drawings, wherein like reference numerals refer to like elements, the principles of the present invention are illustrated as being implemented in a suitable computing system. The following description is based on illustrated embodiments of the invention and should not be taken as limiting the invention with regard to alternative embodiments that are not explicitly described herein.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Figure 2:
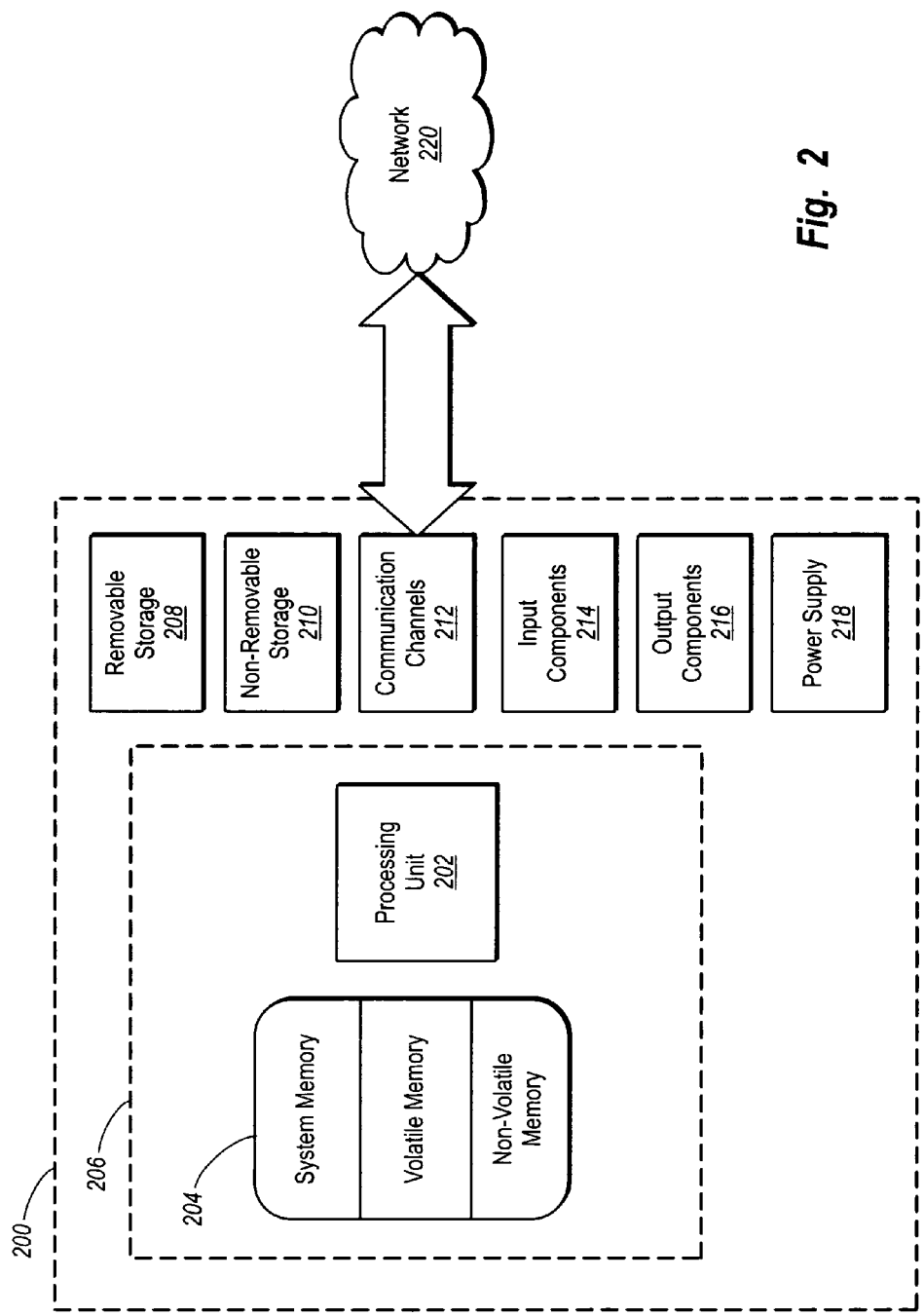
FIG. 2 schematically illustrates a suitable computing system in which the principles of the present invention may be implemented.

FIG. 2 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 2.

The principles of the present invention are operational with numerous other general-purpose or special-purpose computing or communications environments or configurations. Examples of well-known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

Referring to FIG. 2, in its most basic configuration, a computing system 200 typically includes at least one processing unit 202 and memory 204. The memory 204 may be volatile (such as RAM), non-volatile (such as ROM, flash memory, etc.), or some combination of the two. This most basic configuration is illustrated in FIG. 2 by the dashed line 206.

The storage media devices may have additional features and functionality. For example, they may include additional storage (removable and non-removable) including, but not limited to, PCMCIA cards, magnetic and optical disks, and magnetic tape. Such additional storage is illustrated in FIG. 2 by removable storage 208 and non-removable storage 210. Computer-storage media include volatile and non-volatile, removable and non-removable media implemented in any method or technology for storage of information such as computer-readable instructions, data structures, program modules, or other data. Memory 204, removable storage 208, and non-removable storage 210 are all examples of computer-storage media. Computer-storage or readable media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 200 may also contain communication channels 212 that allow the host to communicate with other systems and devices over, for example, network 220. Although the network 220 may include any network type (whether now existing or to be developed in the future), examples include Token Ring, Ethernet, Bluetooth, 802.11, USB, 1394, SMS, SOAP over IP, or the like. Communication a channels 212 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media. Computing system 200 may extend beyond a single computational node to utilize the network for distributed processing.

The computing system 200 may also have input components 214 such as a keyboard, mouse, pen, a voice-input component, a touch-input device, and so forth. Output components 216 include screen displays, speakers, printer, etc., and rendering modules (often called "adapters") for driving them. The computing system 200 has a power supply 218. All these components are well known in the art and need not be discussed at length here.

While FIG. 2 represents a suitable operating environment for the present invention, the principles of the present invention may be employed in any computing system. The computing system illustrated in FIG. 2 is illustrative only, and by no means represents even a small portion of the wide variety of environments in which the principles of the present invention may be implemented. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 3:
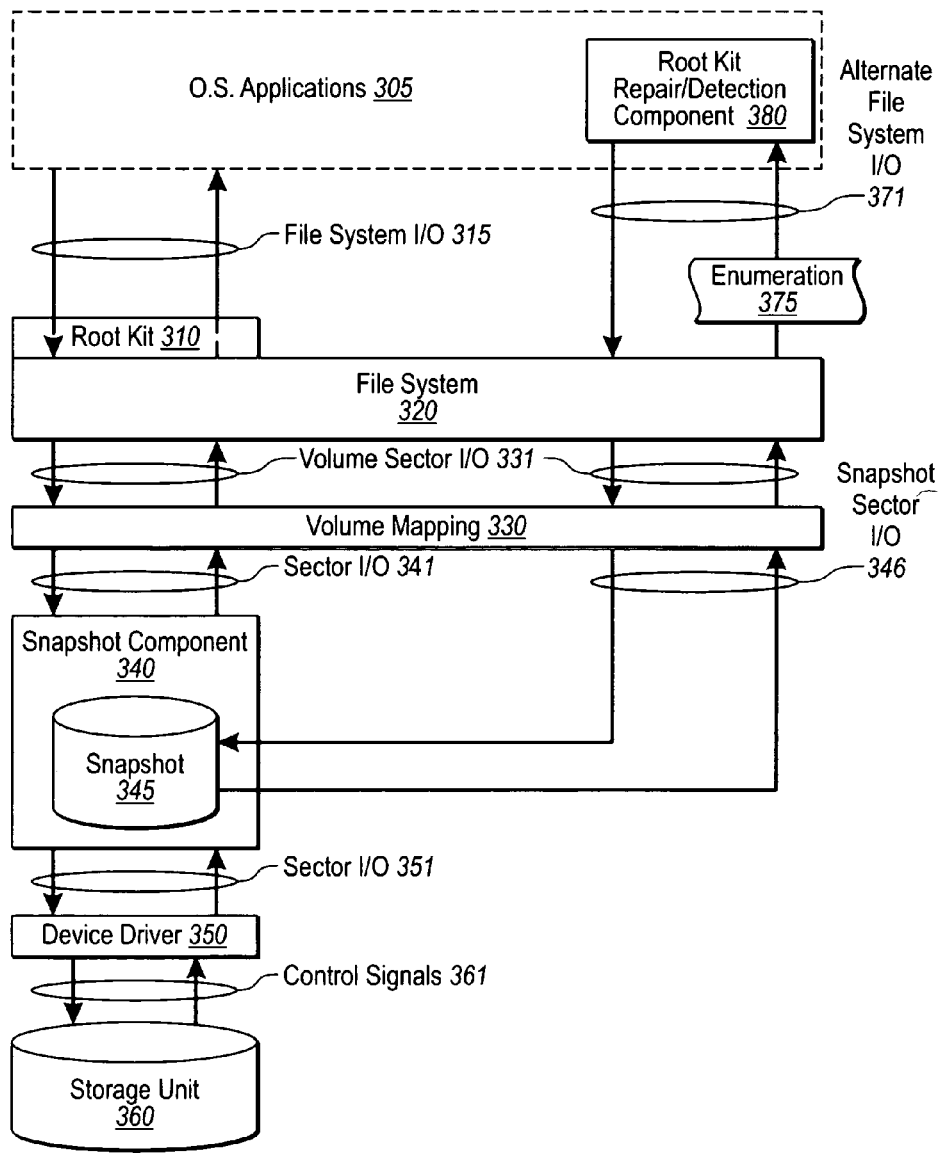
FIG. 3 schematically illustrates a computing system architecture configured to detect a rootkit in accordance with principles of the present invention.

FIG. 3 depicts an example computing system architecture 300 which includes various modules configured to detect a rootkit in accordance with the principles of the present invention. The architecture 300 may be implemented by any computing system, an example of which being the computing system 200 of FIG. 2. Architecture 300 is shown by way of example only and is not intended in any way to limit the scope of the appended claims. It will be obvious to one skilled in the art after having read this description that there may be numerous other computing system architectures that may be configured to implement the principles of the present invention.

The architecture 300 includes operating system (OS) applications 305. OS applications 305 represent the applications and programs of the computing system operating system, for example word processing and financial software programs. These applications and programs may only access the file system 320 using file system I/O 315.

OS applications 305 also include a rootkit repair/detection component 380. Rootkit repair/detection component 380 can be implemented in some embodiments as a rootkit repair component only, in other embodiments as a rootkit detection component only, and in additional embodiments as a combination of a repair and detection component. Accordingly, in this description, rootkit repair/detection component 380 is sometimes referred to as rootkit detection component 380 when discussing the detection of a rootkit and as rootkit repair component 380 when discussing the repair or removal of a rootkit. Rootkit repair/detection component 380 can be implemented as software, hardware, or any combination of the two that is configured to detect and/or repair a rootkit. For example, rootkit repair/detection component 380 can be virus detection software that detects a rootkit and then removes the rootkit. As will be described in more detail to follow, rootkit repair/detect component 380 can access the file system 320 by use of an alternate file system I/O 371 that is not available to the other applications and programs of OS applications 305. However, in some embodiments, rootkit repair/detection component may also access file system 320 using file system The architecture 300 also includes the file system 320, which is the file system for the associated operating system. The file system 320 receives various file-level or directory-level commands from OS applications 305. For instance, the file system 320 may receive a call to read or write a file, or perhaps perform a directory listing. Such file system requests and responses are represented in FIG. 3 as file system I/O 315.

A rootkit 310 is logically positioned above the file system 320 in the file system I/O 315 path. Rootkit 310 represents rootkit code, that when executed by a computing system, potentially manipulates responses to the file system 320 in order to hide itself. For example, the rootkit 310 can manipulate the response to a directory listing request by removing itself from the returned directory listing. Accordingly, the rootkit is able to hide itself from detection, especially from virus detection software that relies upon an accurate directory listing in order to perform the virus detection.

Each file or directory will correspond to one or more sectors in one or more volumes of storage. The file system 320 maps the file or directory that is being operated upon (e.g., in the form of a read or write), to one or more sectors, where the sectors are identified by the combination of the volume and sector. For each of the sectors, the file system 320 requests that the operation be performed on the associated sector and volume by providing an associated request to the volume mapping component 330 using volume sector I/O 331. The file system 320 also potentially receives acknowledgement of the successful performance of the operation and/or the data associated with the operation (e.g., a read sector) to the file system 320 as also represented by the volume sector I/O 331.

The volume mapping component 330 receives the operation request from the file system 320 along with an identification of the sector in the form of the combination of the volume identifier and the sector identifier. The volume mapping component 330 maps the combined volume/sector identifiers into the raw sector identifier recognized by the device driver 350 described below. This allows for a single physical storage unit (such as storage unit 360) to logically include several addressable volumes, without the need for the file system 320 to be aware of how the volumes are physically structured on the storage unit 360. The volume mapping component 330 makes the request for the specific operation to be performed on a particular sector by providing sector I/O 341 to the snapshot component 340, and receives the response also in the form of sector I/O 341. Volume mapping 330 also can make the request for the specific operation to be performed on a particular sector by providing snapshot sector I/O 346 to the snapshot component 340. Snapshot sector I/O 346 is utilized by an alternative file I/O path that will be described in further detail to follow.

The snapshot component 340 interfaces with the device driver 350 also using sector I/O (e.g., sector I/O 351), which may involve simply passing the sector I/O 341 without modification between the volume mapping component 330 and the device driver 350. However, in order to generate a snapshot 345 of the storage unit 360 as the storage unit existed at a particular point in time, while still allowing for a live state of the storage unit to be operated upon, the snapshot component 340 may often perform some manipulations of the sector I/O and/or provide additional sector I/O to the device driver 350 as is well known to those of ordinary skill in the art. In some implementations, the snapshot component 340 may be located between the file system 320 and the volume mapping 330 rather than between the volume mapping 330 and the device driver 350. It is easier to implement the snapshot component 340 above rather than below volume mapping 330, but it may also be easier for some advanced rootkit implementations to avoid detection by the current method if implemented at this alternate location.

Upon receiving a sector-level command from the snapshot component 340 and/or indirectly from the volume mapping component 330 via the snapshot component 340, the device driver 350 performs the requested operation on the appropriate sector of the storage unit 360. Typically, this is accomplished by the device driver 350 generating physical control signals 361 as appropriate given the physical and electronic structure of the storage unit 360 to thereby cause the storage unit to perform the requested operation.

The storage unit 360 may be any physical device where information may be stored. The storage unit 360 can be any storage device known to one skilled in the art, such as a computer hard drive or other persistent memory. Storage unit 360 can also be other physical memory media of computing system 200. Storage unit 360 can further be a compact disk, floppy disk, DVD or other physical removable storage media.

As previously mentioned, interposed between the device driver 350 and the volume mapping unit 330 is the snapshot component 340. The snapshot component 340 may take a snapshot of the entire storage unit 360 or of a single volume within the storage unit or of various portions of the volume as the storage unit content existed at a particular point in time. Changes to the storage unit 360 after the snapshot is taken are not recorded in the snapshot. Note that snapshot component 340 and corresponding snapshot 345 are below the rootkit 310 in the file system I/O 315 path flow. Thus, the snapshot 345 includes the rootkit code that is stored on the storage unit 360, and the rootkit cannot mask itself from the snapshot component 340.

Computing system architecture 300 further includes an alternate file system I/O 371 in addition to the file system I/O 315 already discussed. Alternate file system I/O 371 may have a different source code implementation than file system I/O 315 for interpreting file system 320 data structures, but both file system I/Os interpret these data structures in the same way. Alternate file system I/O 371 is not known to the applications and programs (excepting rootkit repair/detection component 380 as will be described) of OS applications 305 and consequently these applications and programs cannot accesses file system 320 using the alternative file system I/O 371.

Alternate file system I/O 371 is configured to allow rootkit repair/detection component 380 to accesses storage unit 360 without the need to utilize the file system I/O 315 path. Advantageously, this provides no method for the rootkit 310 to insert itself between the storage unit 360 and the rootkit repair/detection component 380. Alternate file system I/O 371 also allows rootkit repair/detection component 380 accesses to the snapshot 345 using snapshot I/O 346 while bypassing the effects of rootkit 310. For instance, the alternative file system I/O 371 may request an enumeration of the files stored on the storage unit 360 or a portion thereof. Accordingly, enumeration 375 of some or all of the files stored in the snapshot 345 may be returned by the alternative file system I/O 371 to rootkit detection/repair component 380. The rootkit repair/detection component 380 can then use enumeration 375 to detect a rootkit. For instance, rootkit repair/detection component 380 may request a directory listing of a directory in which the rootkit might normally appear. By analyzing the name or other structure of the files in the directory, the rootkit may then be detected, since the rootkit did not have an opportunity to remove itself from the directory listing by manipulating the alternate file system I/O 371.

Figure 4:
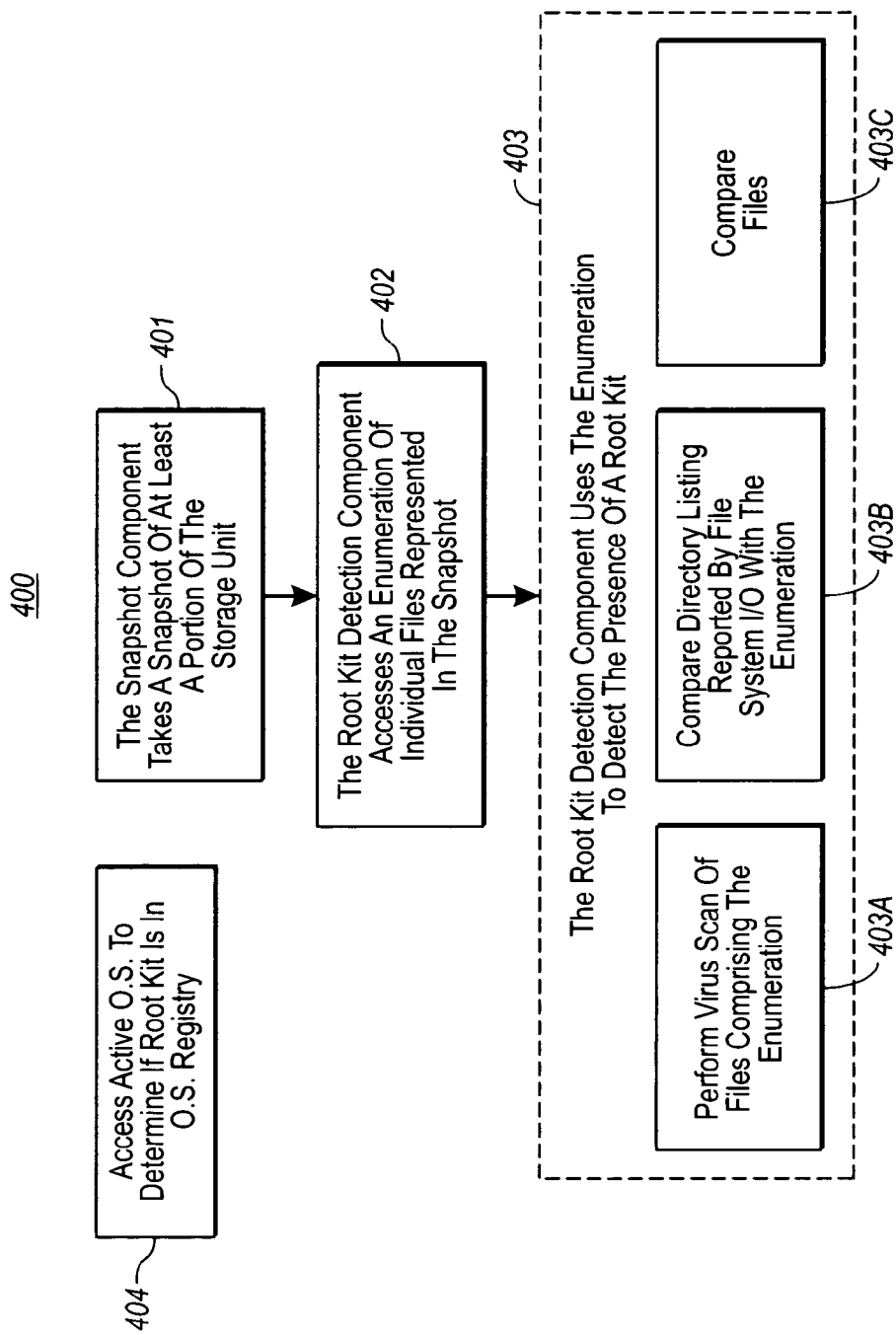
FIG. 4 illustrates a flowchart of a method for a computing system to detect a rootkit in accordance with principles of the present invention.

Turning now to FIG. 4, a flowchart of a method 400 for a computing system (such as that employing architecture 300) to detect a rootkit in accordance with principles of the present invention is illustrated. Method 400 will be described with reference to the architecture 300 of FIG. 3. However, it should be noted that computing system architecture 300 is only one of numerous computing system architectures that may perform method 400 and should not be used to limit the scope of the appended claims.

Method 400 includes an act of a snapshot component taking a snapshot of at least a portion of the storage unit (act 401). For example, snapshot component 340 can take a snapshot 345 of storage unit 360 or a portion of the storage unit. As mentioned previously, snapshot 345 records the contents of the portions of storage unit 360 for which the snapshot was taken. The type of mechanism used for taking the snapshot is not important to the principles of the present invention, and may include any snapshot mechanism, whether now existing, or whether yet to be developed.

Method 400 also includes an act of a rootkit detection component accessing an enumeration of individual files represented in the snapshot (act 402). For example, the rootkit detection component 380 can utilize the alternate file system I/O 371 to accesses enumeration 375 by requesting and receiving enumeration 375 from snapshot 345. Enumeration 375 enumerates the individual files stored on the portion(s) of storage unit 360 that were subjected to the snapshot 345 as previously described. For instance, enumeration 375 may be a directory listing of a directory in which a rootkit might normally appear. Mechanism for requesting and receiving information through the alternative file system I/O 371 are known in the art.

Method 400 further includes an act of the rootkit detection component using the enumeration to detect the presence of a rootkit (act 403). For example, rootkit detection component 380 uses enumeration 375 to detect rootkit 310. For instance, by analyzing the name or other structure of the files in the directory listing described in act 402, the rootkit may then be detected, since the rootkit is not in the path of the alternate file system I/O 371 path, and thus did not have an opportunity to remove itself from the directory listing.

There are many alternative ways for the rootkit detection component to use the enumeration to detect the presence of a rootkit. Several examples will now be discussed. Note that these examples are not exhaustive as there may be other ways for the rootkit detection component to use the enumeration to detect the presence of a rootkit that are not discussed. The listed examples are also not exclusive as more than one can be used at a time to detect the presence of a rootkit.

One way that the enumeration can be used to detect the presence of the rootkit is to have the computing system perform a virus scan of the individual files comprising the enumeration (act 403A). For example, a component of computing system architecture 300, such as, but not limited to, the rootkit detection component 380 can perform a virus scan of the files in the storage unit 360 that are included in enumeration 375. Because enumeration 375 is not in the I/O path of the file system 320, rootkit 310 is not able to remove itself from the listing of files comprising the enumeration 345. The rootkit is thus unable to hide itself from the virus scan and therefore can be detected by the virus scan.

An alternate way that the enumeration can be used to detect the presence of the rootkit is to compare a directory listing reported by the file system I/O with the enumeration of individual files accessed by the rootkit detection component using the alternate file system I/O (act 403B). For example, file system I/O 315 can report a file directory listing of the files in the storage unit 360. Because the rootkit 310 is in the file system I/O 315 path, it may manipulate the file directory listing by removing itself from the listing, thereby hiding itself as previously discussed. This file directory can then be compared with the enumeration 375. Rootkit 310 will not be able to manipulate the enumeration 375 as enumeration 375 is not returned in the file system I/O 315 path containing the rootkit. Thus, rootkit 310 will be listed in enumeration 375. Accordingly, any differences between the file names and/or structures in the directory listing returned by the file system I/O 315 and the enumeration 375 returned by the alternative file system I/O 371 may indicate that the response to the file system I/O 315 from file system 320 has been manipulated, thereby sensing the presence of rootkit 310.

A further alternate way that the enumeration can be used to detect the presence of the rootkit is to compare one or more files returned by file system I/O with one or more files returned by the alternate file system I/O (act 403C). This act allows for detection of file segments that may have been corrupted by a rootkit. For example, as mentioned previously, because rootkit 310 is in the file system I/O path 315, it may hide file segments of files that are otherwise viewable by the file system 320 or it may corrupt these file segments. However, the file segments will not be hidden in the files returned by the alternate file system I/O 371 as the rootkit 310 is not in this I/O path. Accordingly, any differences when comparing the files returned by the file system I/O 315 and the alternate file system I/O 371 may indicate the presence of rootkit 310.

Returning again to FIG. 4, method 400 includes an act of the alternate file system I/O providing access to an active operating system registry to thereby determine if a rootkit is hiding in the active operating system registry (act 404). For example, alternate file system I/O 371 can provide access to a registry of the operating system of computing system architecture 300, allowing a component of computer architecture 300 such as rootkit detection component 380 to determine if a rootkit is hiding in the registry. As depicted, act 404 occurs in parallel with acts 401-403.

Accordingly, the principles of the present invention allow for several alternative ways to detect the presence of a rootkit. Advantageously, there is no need to implement a second operating system in the detection process. Accordingly, there will be less computing system down time when detecting a rootkit, potentially saving valuable time and money. There is also no need to bring a system down on a regular basis, just so that it can be scanned to see if a rootkit is present. This is important, because users and system administrators will not regularly perform offline scans when they don't strongly suspect a problem. Thus if relying exclusively on offline scans to detect rootkits, many rootkits may remain undetected for long periods of time.

Figure 5:
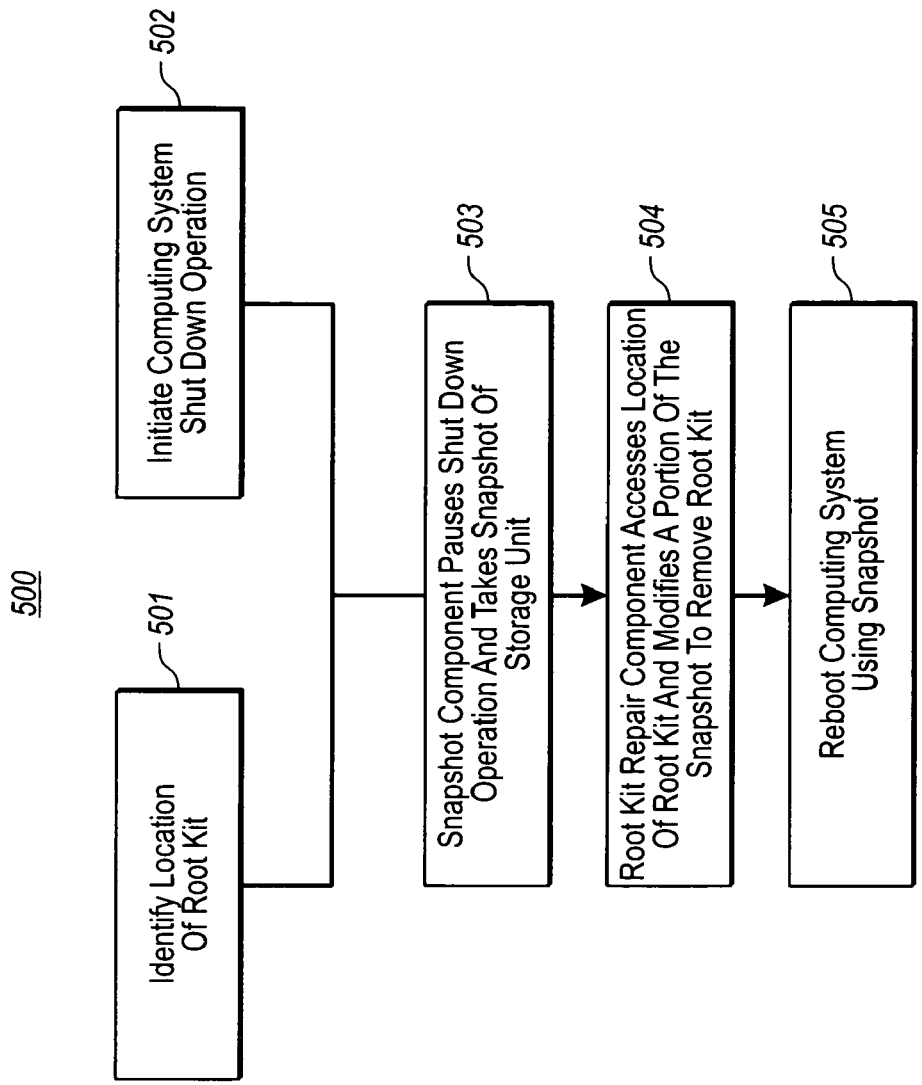
FIG. 5 illustrates a flowchart of a method for a computing system to remove a rootkit in accordance with principles of the present invention.

Referring now to FIG. 5, a flowchart of a method 500 for a computing system to repair or remove a rootkit in accordance with principles of the present invention is illustrated. Method 500 will be described with reference to the computing system architecture 300 of FIG. 3. However, it should be noted that computing system architecture 300 is only one of numerous computing system architectures that may perform method 500 and should therefore not be used to limit the scope of the appended claims.

Method 500 includes an act of identifying a location of a rootkit (act 501). For example, the rootkit detection component can utilize the alternate file system I/O 371 to identify the location of rootkit 310 by one of ways described with respect to FIG. 4 above, although this is not required. For instance, the rootkit detection component 380 can access an enumeration 375 of individual files represented in snapshot 345 and perform a virus scan of these files or compare them with a directory listing returned by file system I/O 315. The rootkit detection component 380 can also identify the location of the rootkit in other ways as well. In addition, the location of the rootkit may be identified by other components and/or modules of the computing architecture 300, such as, for example, the snapshot component 340. The particular component and/or module of computing architecture 300 that identifies the location of the rootkit and the exact method for identifying the location of the rootkit is not important to the principles of the present invention.

Method 500 also includes an act of initiating a computing system shut down operation (act 502). For example, any component of computing system architecture 300 including, for example, the snapshot component 340, can initiate the shut down operation. In one embodiment, once initiated, the shutdown operation proceeds to shut down in the following order: some or all of the running O.S. applications 305, the primary file system 320, the volume mapping component 330, the device driver 350, and finally the storage unit 360. Advantageously, this shut down order may help facilitate the removal of the rootkit as will be explained. In many embodiments, act 502 occurs after act 501, but this is not required as some parts or even all of the identification may occur after the shut down operation has been initiated.

Method 500 further includes an act of the snapshot component pausing the shutdown operation prior to the completion of the shut down operation and taking a snapshot of at least a portion of the file storage unit (act 503). For example, snapshot component 340 can pause the shutdown operation and take a snapshot 345. As mentioned previously, during the shut down operation the computing system architecture 300 will shut down the functional layers of the computing architecture logically positioned above the device driver 350 (i.e., primary file system 320 and volume mapping component 330) before shutting down the device driver 350. Advantageously, because the snapshot component 340 is logically positioned above the device driver 350, when the snapshot component 340 pauses the shutdown operation, the shut down operation will almost be complete. Accordingly, there will be very few changes to the storage unit 360 after snapshot component 340 has taken snapshot 345.

Method 500 includes an act of a rootkit repair component accessing the identified location of the portion of the storage unit containing the rootkit and modifying the portion of the snapshot of the storage unit so as repair or remove the rootkit (act 504). For example, rootkit repair component 380 can access the location of rootkit 310 in the storage unit 360, which will be in the portion of the storage unit subjected to the snapshot 345. The rootkit repair component 380, then removes or repairs the rootkit by modifying the portion of the storage unit 360 containing the rootkit. In some embodiments, the rootkit repair component may be software and/or hardware that is embedded in snapshot component 340.

For example, in some embodiments, rootkit repair component 380 modifies the portion of the storage unit 360 by removing a directory listing for files associated with the rootkit. For instance, suppose that code comprising rootkit 310 was stored in sectors 1-5 of storage unit 360. Further suppose that a directory listing for the rootkit code was stored in sector 6. Rootkit repair component 380 can modify the storage unit 360 by removing the directory listing in sector 6. Accordingly, when the computing system is rebooted, as the directory listing for the rootkit in sector 6 has been removed, the rootkit code is no longer accessible by the computing system and thus has effectively been removed, even though the actual rootkit code is still stored in sectors 1-5 of storage unit 360.

Method 500 may also include an act of rebooting the computing system using the snapshot of at least a portion of the file storage unit (act 505). For example, computing system architecture 300 can reboot using snapshot 345 as its active view instead of the normal active view of the operating system. As mentioned in act 504, the portion of the storage unit 360 subjected to the snapshot has been modified to repair or remove the rootkit. Accordingly, rebooting from the snapshot ensures that the rootkit code is not loaded or executed by computing system architecture 300. Because the snapshot was taken just prior to the shut down of computing system architecture 300, very few changes to the storage unit 360 will have occurred after the snapshot was taken. Therefore, using the snapshot 345 as the active view will result in little loss of information.

Accordingly, the principles of the present invention allow for the repair or removal of a detected rootkit. Advantageously, there is no need to reboot the computing system using a second operating system to remove the rootkit. Instead, the present invention allows for an automated process that a single operating system may implement to remove a rootkit. Accordingly, there will be less computing system down time when removing a rootkit, potentially saving valuable time and money.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for implementing a method for a computing system to detect the presence of a rootkit in the form of rootkit code that, when executed, manipulates responses to a file system, the computing system including an operating system, a storage unit, a snapshot component configured to take a snapshot of the storage unit, and a rootkit detection component, the computer program product comprising one or more computer-readable storage media having thereon computer-executable instructions that, when executed by one or more processors of the computing system, cause the computing system to perform the method, the method comprising:
   an act of initiating a computing system shut down operation;
   an act of the snapshot component pausing the shutdown operation prior to the completion of the shut down and taking a snapshot of at least a portion of the storage unit, wherein the act of the snapshot component pausing the shutdown operation prior to the completion of the shut down comprises shutting down at least one functional layer of the computing system before shutting down a device driver for the storage unit, wherein the at least one functional layer is logically positioned above the device driver;
   an act of the rootkit detection component accessing an enumeration of individual files represented in the snapshot using an alternate file system I/O, wherein:
     the operating system comprises the rootkit detection component;
     the operating system comprises a first file system I/O;
     the alternate file system I/O has a different source code implementation than the first file system I/O for interpreting file system data structures; and
   an act of the rootkit detection component using the enumeration to detect the presence of a rootkit.

2. A computer program product in accordance with claim 1, wherein the act of the rootkit detection component using the enumeration to detect the presence of a rootkit comprises:
   an act of performing a virus scan of the individual files comprising the enumeration.

3. A computer program product in accordance with claim 1, wherein the act of the rootkit detection component using the enumeration to detect the presence of a rootkit comprises:
   an act of comparing a directory listing reported by the first file system I/O with the enumeration of individual files accessed by the rootkit detection component using the alternate file system I/O.

4. A computer program product in accordance with claim 1, wherein the act of the rootkit detection component using the enumeration to detect the presence of a rootkit comprises:
   an act of comparing one or more files returned by the first file system I/O with one or more files returned by the alternate file system I/O to thereby determine if a rootkit is corrupting data contained within the one or more files returned by the file system I/O.

5. A computer program product in accordance with claim 1, wherein the alternate file system I/O provides access to an active operating system registry to thereby determine if a rootkit is hiding in the active operating system registry.

6. A computer program product in accordance with claim 1, wherein:
   each application installed on the operating system, other than the rootkit detection component, uses the first file system I/O to access data and does not use the alternate file system I/O to access data.

7. A method for a computing system to detect the presence of a rootkit in the form of rootkit code that, when executed, manipulates responses to a file system, the computing system including, an operating system, a storage unit comprising individual files, a snapshot component configured to take a snapshot of the storage unit, and a rootkit detection component, the method comprising:
   an act of initiating a computing system shut down operation;
   an act of the snapshot component pausing the shutdown operation prior to the completion of the shut down and taking a snapshot of at least a portion of the storage unit, wherein the act of the snapshot component pausing the shutdown operation prior to the completion of the shut down comprises shutting down at least one functional layer of the computing system before shutting down a device driver for the storage unit, wherein the at least one functional layer is logically positioned above the device driver;
   an act of the rootkit detection component accessing an enumeration of the individual files represented in the snapshot using an alternate file system I/O, wherein:
     the operating system comprises the rootkit detection component;
     the operating system comprises a first file system I/O;
     the alternate file system I/O has a different source code implementation than the first file system I/O for interpreting file system data structures;
     each application installed on the operating system, other than the rootkit detection component, uses the first file system I/O to access data and does not use the alternate file system I/O to access data; and
   an act of the rootkit detection component using the enumeration to detect the presence of a rootkit.

8. A computer program product in accordance with claim 1, wherein the alternate file system I/O is not available to applications other than the rootkit detection component.

9. A computer program product for use in a computing system to remove a rootkit representing rootkit code from a storage unit, wherein the rootkit code, when executed, manipulates responses to a file system, the computing system including the storage unit, a snapshot component configured to take a snapshot of the storage unit, and a rootkit repair component, the computer program product comprising one or more computer-readable storage media having thereon computer-executable instructions that, when executed by one or more processors of the computing system, cause the computing system to perform the method, the method comprising:

an act of identifying a location of a rootkit;

an act of initiating a computing system shut down operation;

an act of the snapshot component pausing the shutdown operation prior to the completion of the shut down and taking a snapshot of at least a portion of the storage unit, wherein the act of the snapshot component pausing the shutdown operation prior to the completion of the shut down comprises shutting down at least one functional layer of the computing system before shutting down a device driver for the storage unit, wherein the at least one functional layer is logically positioned above the device driver;

an act of the rootkit repair component accessing the identified location of the portion of the storage unit containing the rootkit and modifying the portion of the snapshot of the storage unit so as remove the rootkit; and an act of rebooting the computing system from the snapshot after the rootkit has been removed from the snapshot.

10. A computer program product in accordance with claim 9, wherein:

the act of rebooting the computing system from the snapshot is performed instead of rebooting the computing system from a normal view of an operating system of the computing system.

11. A computer program product in accordance with claim 9, wherein the act of identifying a location of a rootkit is performed by the rootkit repair component.

12. A computer program product in accordance with claim 9, wherein the act of identifying a location of a rootkit is performed by the snapshot component.

13. A computer program product in accordance with claim 9, wherein the act of initiating a computing system shut down operation is performed by the snapshot component.

14. A computer program product in accordance with claim 9, wherein the rootkit repair component is implemented in one of hardware or software or any combination of hardware and software.

15. A computer program product in accordance with claim 9, wherein the rootkit repair component is embedded in the snapshot component.

16. A computer program product in accordance with claim 9, wherein the act of modifying the portion of the snapshot of the file storage unit so as to remove the rootkit comprises one of removing a directory entry for files associated with the rootkit; or repairing or modifying individual files to remove embedded rootkit code from the individual files.

17. A method for a computing system to remove a rootkit representing rootkit code from a storage unit, wherein the rootkit code, when executed, manipulates responses to a file system, the computing system including the storage unit, a snapshot component configured to take a snapshot of the storage unit, and a rootkit repair component, the method comprising:

an act of identifying a location of a rootkit;

an act of initiating a computing system shut down operation;

an act of the snapshot component pausing the shutdown operation prior to the completion of the shut down and taking a snapshot of at least a portion of the storage unit, wherein the act of the snapshot component pausing the shutdown operation prior to the completion of the shut down comprises shutting down at least one functional layer of the computing system before shutting down a device driver for the storage unit, wherein the at least one functional layer is logically positioned above the device driver;

an act of the rootkit repair component accessing the identified location of the portion of the storage unit containing the rootkit and modifying the portion of the snapshot of the storage unit so as remove the rootkit; and an act of rebooting the computing system from the snapshot after the rootkit has been removed from the snapshot.

18. A method in accordance with claim 17, wherein:

the act of rebooting the computing system from the snapshot is performed instead of rebooting the computing system from a normal view of an operating system of the computing system.

19. A method in accordance with claim 17, wherein the act of modifying the portion of the snapshot of the file storage unit so as to remove the rootkit comprises one of removing a directory entry for files associated with the rootkit; or repairing or modifying individual files to remove embedded rootkit code from the individual files.

\* \* \* \* \*

UNITED STATES PATENT AND TRADEMARK OFFICE
CERTIFICATE OF CORRECTION

PATENT NO. : 7,631,357 B1  
APPLICATION NO. : 11/243824  
DATED : December 8, 2009  
INVENTOR(S) : Russell R. Stringham It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Second Day of November, 2010

David J. Kappos  
*Director of the United States Patent and Trademark Office*